United States Patent
Cochrane et al.

(10) Patent No.: US 6,339,769 B1
(45) Date of Patent: Jan. 15, 2002

(54) QUERY OPTIMIZATION BY TRANSPARENTLY ALTERING PROPERTIES OF RELATIONAL TABLES USING MATERIALIZED VIEWS

(75) Inventors: Roberta Jo Cochrane, Los Gatos; George Lapis, San Jose; Ting Yu Leung, San Jose; Mir Hamid Pirahesh, San Jose; Monica Sachiye Urata, Saratoga; Richard Sefton Sidle, Mountain View; David E. Simmen, San Jose, all of CA (US); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/152,551

(22) Filed: Sep. 14, 1998

(51) Int. Cl.[7] ................................................. G06F 17/30
(52) U.S. Cl. ...................... 707/2; 707/3; 707/4; 707/10; 707/100; 707/104
(58) Field of Search .......................... 707/201, 10, 203, 707/2, 3, 1, 4, 104, 5, 6, 7, 100

(56) References Cited

U.S. PATENT DOCUMENTS

| | | | | |
|---|---|---|---|---|
| 5,276,870 A | * | 1/1994 | Shan et al. | 707/2 |
| 5,535,385 A | * | 7/1996 | Griffin et al. | 707/3 |
| 5,680,603 A | * | 10/1997 | Bhargava et al. | 707/2 |
| 5,890,148 A | * | 3/1999 | Bhargava et al. | 707/2 |
| 5,897,632 A | * | 4/1999 | Dar et al. | 707/2 |
| 5,960,423 A | * | 9/1999 | Chaudhuri et al. | 707/2 |
| 5,963,933 A | * | 10/1999 | Cheng et al. | 707/2 |
| 5,983,215 A | * | 11/1999 | Ross et al. | 707/2 |
| 5,991,754 A | * | 11/1999 | Raitto et al. | 707/2 |
| 6,026,390 A | * | 2/2000 | Ross et al. | 707/2 |
| 6,058,401 A | * | 5/2000 | Stamos et al. | 707/201 |
| 6,199,063 B1 | * | 3/2001 | Colby et al. | 707/4 |

OTHER PUBLICATIONS

Yue et al., "Multiple view consistency for data warehousing", IEEEE, pp. 289–300, Apr. 1997.*
Wagner et al., "Deferred maintenance of replicated objects in single site databases", database and expert system, pp. 476–481, Sep. 1996.*
Kamel et al., "Semi materialization: a performance analysis", system sciences, pp. 125–135, vol. 2, Jan. 1991.*
Segev et al., "Maintaining materialized views in distributed databases", data engineering, pp. 262–270, Feb. 1989.*
Segev et al., "Updating distributed materialized views", IEEE, pp. 173–184, Jun. 1989 vol. 1, Issue:2.*
Ezeife, "A uniform approach for selecting views and indexes in a data warehouse", database engineering and application Symposium, pp. 151–160, Aug. 1997.*
Colby, L.S. et al., "Red Brick Vista: Aggregate Computation and Management," Proceedings of the 14th International Conference on Data Engineering, Orlando, Florida, Feb. 23–27, 1998.

(List continued on next page.)

*Primary Examiner*—Jean M. Corrielus
(74) *Attorney, Agent, or Firm*—Gates & Cooper LLP

(57) ABSTRACT

A method, apparatus, and article of manufacture for optimizing database queries using a materialized view for a table referenced in the query, wherein the materialized view has different properties than the referenced table. The materialized view may be replicated across multiple processors of the computer system, so that some or all of the query can be executed in a local fashion wherein there is no data movement required to perform the operations. The materialized view also may be partitioned across multiple processors of the computer system using a different partitioning key than the referenced table. The materialized view may be a vertical and/or horizontal subset of the table, so that only selected columns and/or tuples from the table are present therein. Columns may be added to the materialized view to contain pre-computed results of complex expressions, and indices may be created on the columns of the materialized view.

72 Claims, 12 Drawing Sheets

OTHER PUBLICATIONS

Bello, R.G. et al., "Materialized Views In Oracle," Proceedings of the 24$^{th}$ VLDB Conference, New York, 1998.

Srivastava, D. et al, "Answering Queries with Aggregation Using Views," Proceedings of the 22$^{nd}$ VLDB Conference, Mumbai (Bombay), India, 1996.

* cited by examiner

QUERY OPTIMIZATION BY TRANSPARENTLY ALTERING PROPERTIES OF RELATIONAL TABLES USING MATERIALIZED VIEWS

BACKGROUND OF THE INVENTION

1. Field of the Invention.

This invention relates in general to database management systems performed by computers, and in particular, to the optimization of queries by transparently altering properties of relational tables using materialized views.

2. Description of Related Art.

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

For most RDBMS software, combinations of tables and views are used to access data stored in tables in the database. Indices are often used to improve the performance of retrieving data from tables. However, indices are generally limited to columns from base tables. Thus, indices are not seen as suitable for:

results of aggregations, and results of joins for commonly used subsets of the data.

A view definition includes a query that, if processed, provides a temporary results table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against the created table, provided that the users are aware how the results were derived. Generally, the RDBMS software is not aware that such a table is any different from any other table in the database. However, this table cannot be used by an optimizer within the RDBMS software to improve performance, even though the table may contain data that would drastically improve the performance of other queries.

This leads to the notion of summary tables or materialized views as envisioned by the present invention. These tables are similar to the created table described above, except that the definition of the table is based on a "full select" (much like a view) that is materialized in the table. The columns of the table are based on the elements of the select list of the full select.

In the present invention, with properly defined summary tables, the RDBMS software can be made aware of how the result in the summary table was derived. When an arbitrarily complex query is submitted, an optimizer in the RDBMS software can consider using the summary tables to answer the query, which is a technique that requires performing subsumption tests between the query and summary table definition, and then performing compensation work once the optimizer decides that the summary table can be used for the answer.

A further evolution of materialized views according to the present invention is the ability to replicate a database-managed replica of a materialized view on each database partition of a table stored on a shared-nothing, massively parallel processing (MPP) computer system. These replicated materialized views improve the performance in situations where co-location of the base tables is not possible (as it will become evident in this invention), and yet the cost of having the data reside on every partition is small. This is typically useful for dimension tables in a data warehouse.

There are extensive research activities and literature on this topic, as disclosed in the following publications, all of which are incorporated by reference herein:

1. L. S. Colby, R. L. Cole, E. Haslam, N. Jazaeri, G. Johnson, W. J. McKenna, L. Schumacher, D. Wilhite. Red Brick Vista: Aggregate Computation and Management. Proceedings of the $14^{th}$ Int'l. Conference on Data Engineering, Orlando, Fla., 1998.

2. R. Bello, K. Dias, A. Downing, J. Feenan, J. Finnerty, W. Norcott, H. Sun, A. Witkowski, M. Ziauddin. Materialized Views In Oracle. Proceedings of the $24^{th}$ VLDB Conference, New York, 1998.

3. D. Srivastava, S. Dar, H. jagadish, A. Levy. Answering Queries with Aggregation Using Views. Proceedings of the $22^{nd}$ VLDB Conference, Mumbai, India, 1996.

However, the current state of art does not address performance issues arising from the MPP environment. Thus, there is a need in the art for improved techniques for the replication of materialized views in an MPP environment.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries using a materialized view for a base table referenced in the query, wherein the materialized view has different properties than the base table. The query is rewritten to use the materialized view rather than the base table for optimal query performance.

The materialized view may be a vertical and/or horizontal subset of a base table, so that only selected columns and/or tuples from the table are present therein. Columns may be added to the materialized view to contain pre-computed results of expressions, and indices may be created on columns.

The materialized view itself may be replicated across the processors of the computer system. Alternatively, the materialized view may be partitioned across the processors of the computer system, wherein a partitioning key for the materialized view is different from that of the base table referenced in the query.

With the capability of transparent and automatic query rerouting, an optimizer of the RDBMS software has the freedom to choose different query execution strategies based on different properties, and hence, the properties of the base table are transparently altered using the materialized view for the purpose of query optimization.

It is an object of the present invention to optimize queries using materialized views that can be replicated and/or partitioned across multiple processors. More specifically, it is an object of the present invention to optimize RDBMS software using replicated and/or partitioned copies of materialized views.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
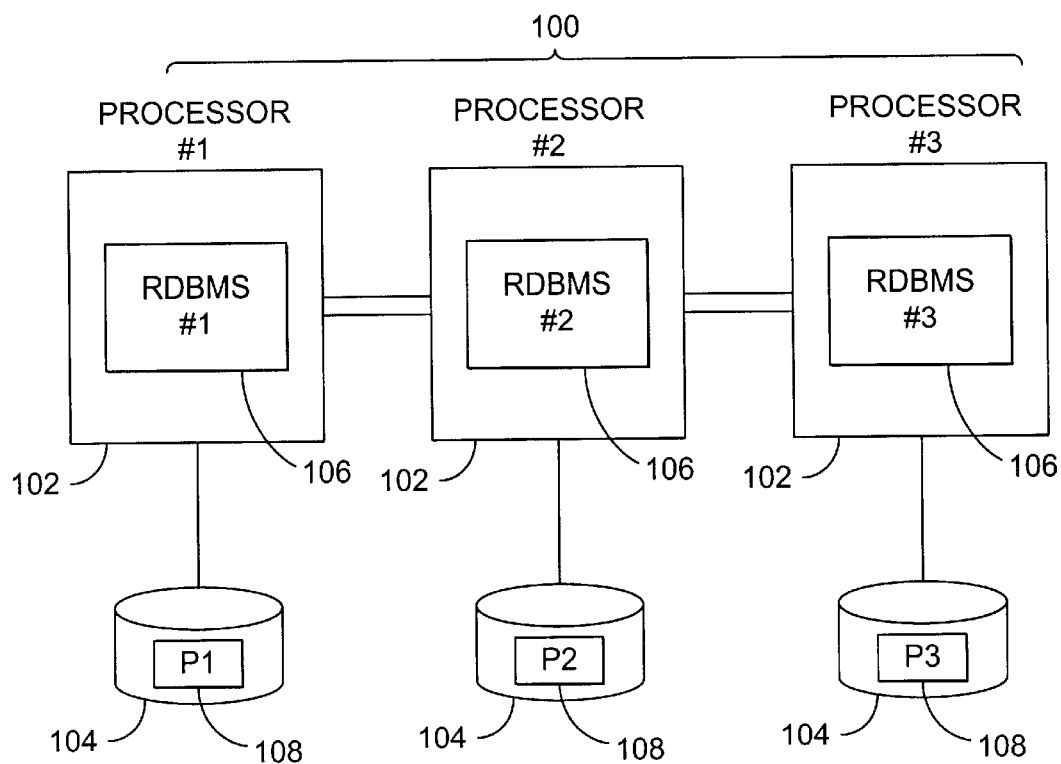
FIG. 1 illustrates an exemplary computer hardware environment that could be used with the preferred embodiment of the present invention.

FIG. 1 illustrates an exemplary computer hardware environment that could be used with the preferred embodiment of the present invention. In the exemplary environment, a massively parallel processing 04PP) computer system 100 is comprised of a plurality of interconnected processors 102, each of which is connected to one or more data storage devices 104, such as disk drives.

Each of the processors 102 execute one or more threads of a relational database management system (RDBMS) software 106, so that processing functions are divided among the processors 102 in the computer system 100. Further, each of the data storage devices 104 store one or more partitions (P1,P2,P3) of one or more tables in the relational database 108 in order to fully parallelize access and retrieval functions among both the processors 102 and the data storage devices 104.

Operators of the computer system 100 use a terminal or workstation to transmit electrical signals to and from the computer system 100 that represent commands for performing various search and retrieval functions, termed queries, against the databases. In the preferred embodiment, these queries conform to the Structured Query Language (SQL) standard, and invoke functions performed by the RDBMS software 106.

Generally, the RDBMS software 106 comprises instructions and/or data that is embodied in or retrievable from a computer-readable device, medium, or carrier, e.g., a data storage device 104, a remote device coupled to the computer system 100 by a data communications device, etc. Moreover, these instructions and/or data, when read, executed, and/or interpreted by the computer system 100, cause the computer system 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Interactive SQL Execution

Figure 2:
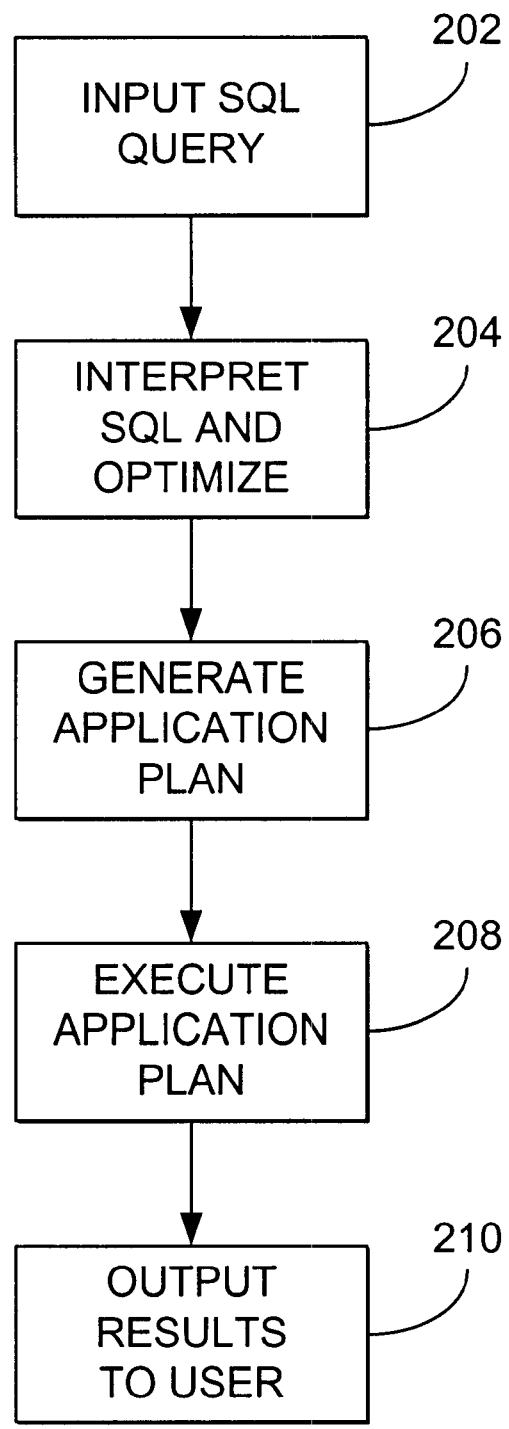
FIG. 2 is a flowchart illustrating the steps necessary for the interpretation and execution of SQL statements in an interactive environment according to the preferred embodiment of the present invention.

FIG. 2 is a flowchart illustrating the steps necessary for the interpretation and execution of SQL statements in an interactive environment according to the preferred embodiment of the present invention. Block 202 represents the input of SQL statements into the computer system 100. Block 204 represents the step of compiling or interpreting the SQL statements. An optimization function within block 204 may transform or optimize the SQL query in a manner described in more detail later in this specification. Block 206 represents the step of generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results.

Embedded/Batch SQL Execution

Figure 3:
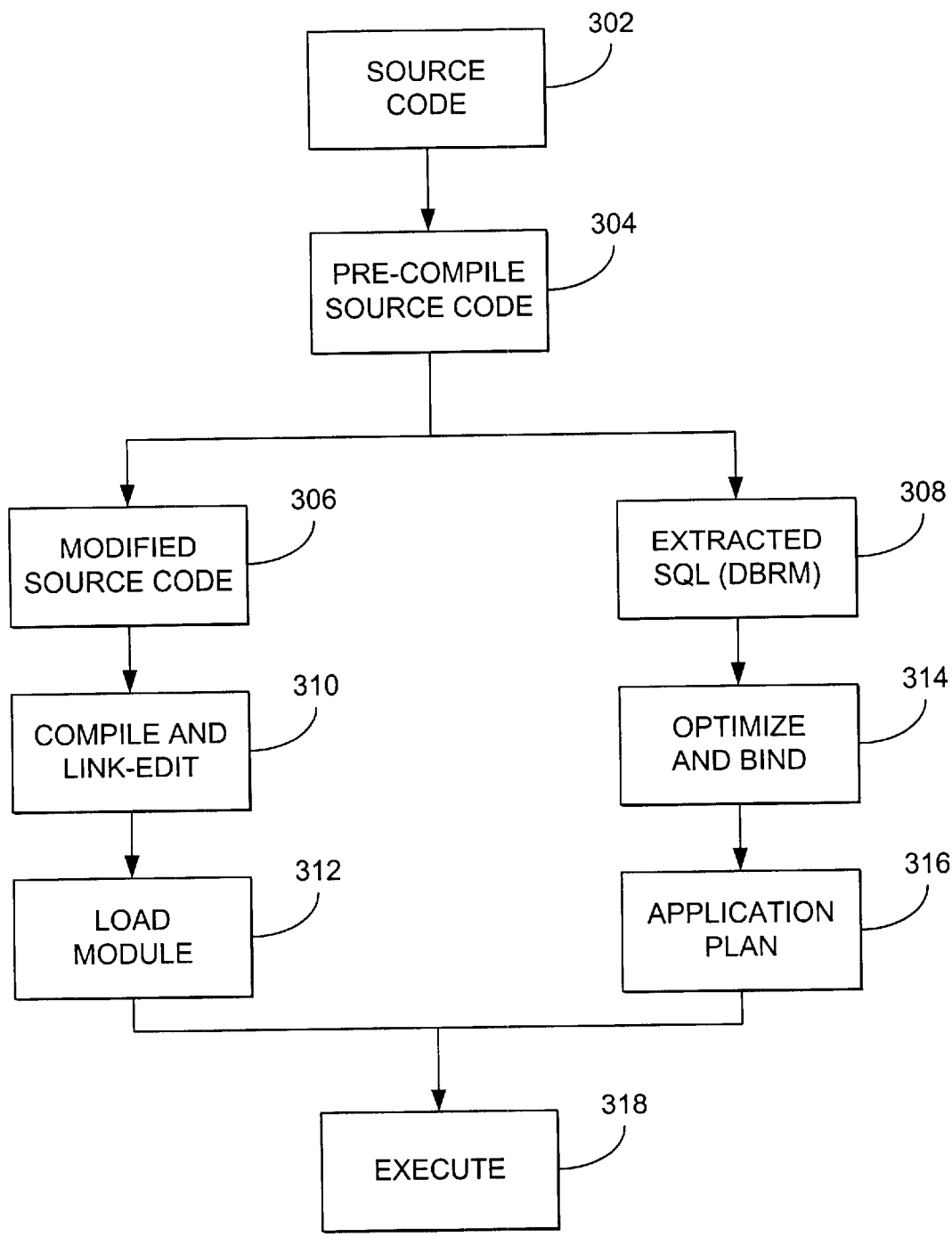
FIG. 3 is a flowchart illustrating the steps necessary for the interpretation and execution of SQL statements embedded in source code according to the preferred embodiment of the present invention.

FIG. 3 is a flowchart illustrating the steps necessary for the interpretation and execution of SQL statements embedded in source code according to the preferred embodiment of the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module PBRM) 308. The modified source module 306 contains host language calls to the RDBMS software 106, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 may reorder or optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Description of the Optimization Technique

The preferred embodiment of the present invention discloses an improved optimization technique that is typically performed at step 204 of FIG. 2 or step 314 of FIG. 3. Specifically, the preferred embodiment of the present invention discloses an improved optimization technique using the Query Graph Model (QGM).

A QGM represents a semi-procedural dataflow graph of a query, wherein the QGM is basically a high-level, graphical representation of the query. Boxes are used to represent relational operations, while arcs between boxes are used to represent quantifiers, i.e., table references. Each box includes the predicates that it applies, an input or output order specification (if any), a distinct flag, and so on. The basic set of boxes include those for SELECT, GROUP BY, and UNION. A join operation is represented by a SELECT box with two or more input quantifiers, while an ORDER BY operation is represented by a SELECT box with an output order specification.

Many SQL query compilation and optimization techniques using the Query Graph Model (QGM) have been performed in the prior art, as disclosed in the publication, Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which is incorporated by reference herein.

The operation of the preferred embodiment of the present invention can best be understood in context, i.e., using a real-world example, such as a data warehouse application for a credit card company performed by the RDBMS software 106 in a shared-nothing, massively parallel processing (MPP) computer system 100. An example of such an MPP computer system 100 comprises an IBM® SP2 system running DB® Universal Database (UDB) version 5.2.

Figure 4:
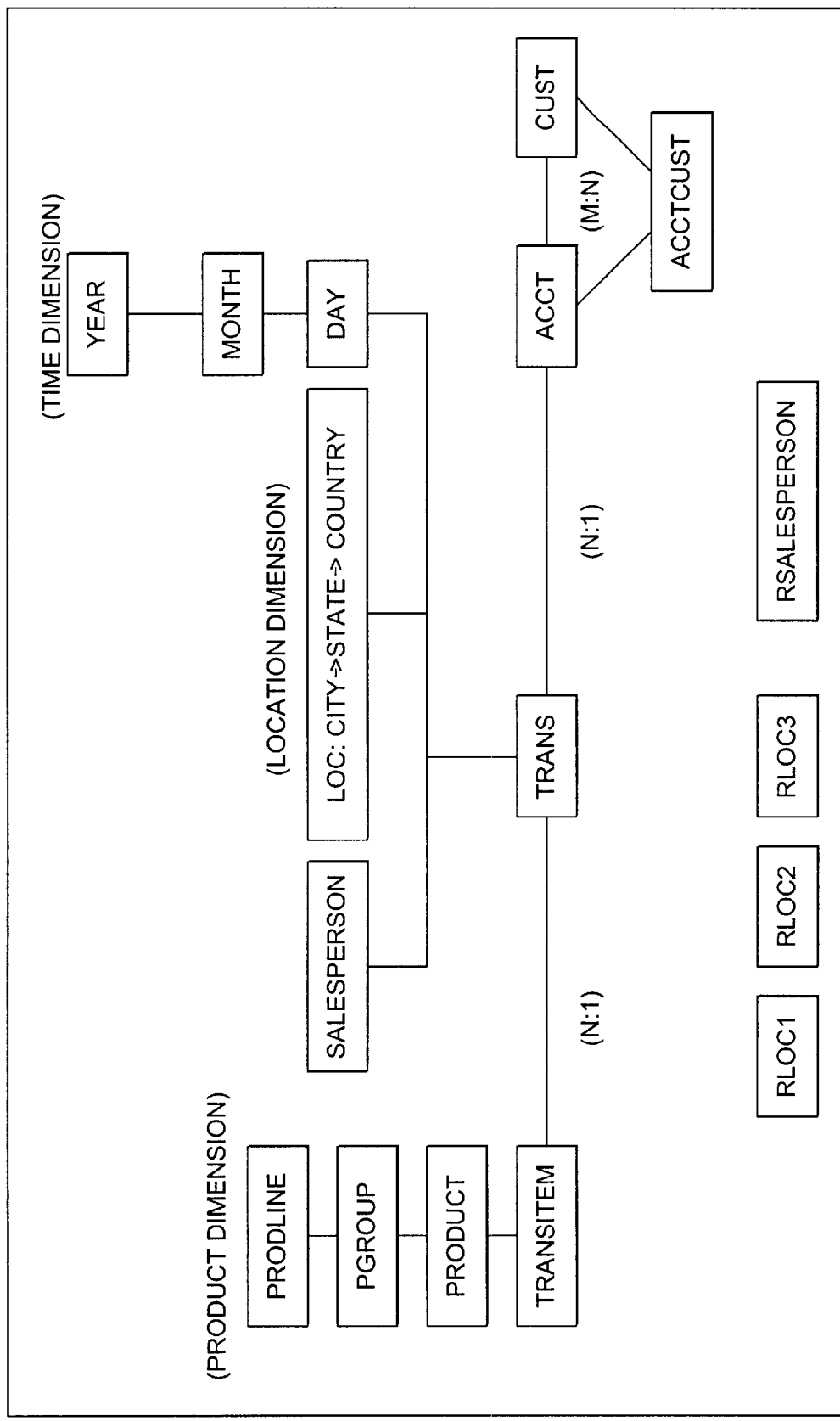
FIG. 4 is a block diagram that illustrates a star schema in the preferred embodiment of the present invention.

In the example application, the MPP computer system 100 of the credit card company stores credit card customer information, their credit card accounts, and transactions that customers made using credit cards for purchases. A possible database schema, comprising a "star" schema, is illustrated by FIG. 4 and described below:

Table CUST contains customer information.

Table ACCT contains credit card account information. Each customer may have one or more credit cards (i.e., one or more accounts) and a joint account may have one or more customers. Thus, the schema models M:N relationships between table CUST and table ACCT. In order to do this, an auxiliary table ACCTCUST captures the association information between accounts (ACCTS) and customers (CUST).

Table SALESPERSON contains salesperson information.

Table TRANS contains transaction information. A customer may make a number of purchases using a particular credit card, and the transaction information is stored in table TRANS. Each transaction was made by a particular salesperson at a particular time and in a particular store. The salesperson, purchase time and location can be aggregated along their respective dimensions.

Table TRANSITEM contains information about transactions on each item. In each transaction, any number of items may be purchased, and TRANSITEM stores this information and the product information can be aggregated along the product hierarchy.

Table PRODUCT contains information about products, such as cameras, VCRs, etc.

Table PGROUP contains product category information.

Table PRODLINE contains information about product lines.

The following "CREATE TABLE" statements may be used to create the tables shown in FIG. 4.

```
CREATE TABLE CUST(
ID INT NOT NULL PRIMARY KEY,
MARITAL STATUS CHAR(1),
NAME_VARCHAR(30),
INCOME_RANGE INT NOT NULL,
ZIPCODE INT,
RESIDENCE VARCHAR(5))
PARTITIONING KEY (ID);
CREATE TABLE ACCT(
ID INT NOT NULL PRIMARY KEY,
CUSTID INT NOT NULL,
CONSTRAINT CUST_ACCT FOREIGN KEY
   (CUSTID)
   REFERENCES CUST))
   PARTITIONING KEY (ID);
CREATE TABLE SALESPERSON
ID INT NOT NULL PRIMARY KEY,
NAME VARCHAR(100),
SALARY FLOAT,
COMMISSION FLOAT,
BONUS FLOAT,
AWARD FLOAT)
PARTITIONING KEY (ID);
CREATE TABLE LOC(
ID INT NOT NULL PRIMARY KEY,
CITY VARCHAR(10),
STATE CHAR(2),
COUNTRY VARCHAR(10)
ADDRESS VARCHAR(200),
PARTITIONING KEY (ID));
CREATE TABLE TRANS(
ID INT NOT NULL PRIMARY KEY,
ACCTID INT NOT NULL,
PDATE DATE NOT NULL,
STATUS VARCHAR(15),
LOCID INT NOT NULL,
SALESID INT NOT NULL,
CONSTRAINT SALES_TRANS FOREIGN KEY
   (SALESID)
   REFERENCES SALESPERSON,
CONSTRAINT ACCT_TRANS FOREIGN KEY
   (ACCTID)
   REFERENCES ACCT,
CONSTRAINT LOC_ACCT FOREIGN KEY (LOCID)
   REFERENCES LOC)
PARTITIONING KEY (ID);
CREATE TABLE TRANSITEM(
ID INT NOT NULL PRIMARY KEY,
```

TRANSID INT NOT NULL,
AMOUNT DECIMAL(10,2) NOT NULL,
PRODID INT NOT NULL,
CONSTRAINT TRANS_TRANSITEM FOREIGN KEY
    (TRANSID) REFERENCES TRANS,
CONSTRAINT PGROUP_TRANSITEM FOREIGN KEY
    (PRODID) REFERENCES PRODUCT)
PARTITIONING KEY (ID);
CREATE TABLE PRODLINE(
ID INT NOT NULL PRIMARY KEY,
NAME VARCHAR(20))
PARTITIONING KEY (ID);
CREATE TABLE PGROUP(
ID INT NOT NULL PRIMARY KEY,
NAME VARCHAR(12),
LINEID INT NOT NULL,
CONSTRAINT PRODLINE_PGROUP FOREIGN KEY (LINEID)
    REFERENCES PRODLINE)
PARTITIONING KEY (ID);
CREATE TABLE PRODUCT(
ID INT NOT NULL PRIMARY KEY,
PROD DESCRIPTION VARCHAR(30),
PG_ID INT NOT NULL,
CONSTRAINT PRODUCT_PG FOREIGN KEY (PG_ID)
    REFERENCES PGROUP)
PARTITIONING KEY (ID);
CREATE TABLE ACCTCUST (
ACCTID INT NOT NULL, CUSTID INT NOT NULL,
CONSTRAINT ACCT FOREIGN KEY (ACCTIDD)
    REFERENCES ACCT,
CONSTRAINT CUST FOREIGN KEY (CUSTID)
    REFERENCES CUST)
PARTITIONING KEY (ACCTID);

In this application, all tables in this database are partitioned across all the processors 102 in the MPP computer system 102 via the partitioning keys defined above.

Figure 5:
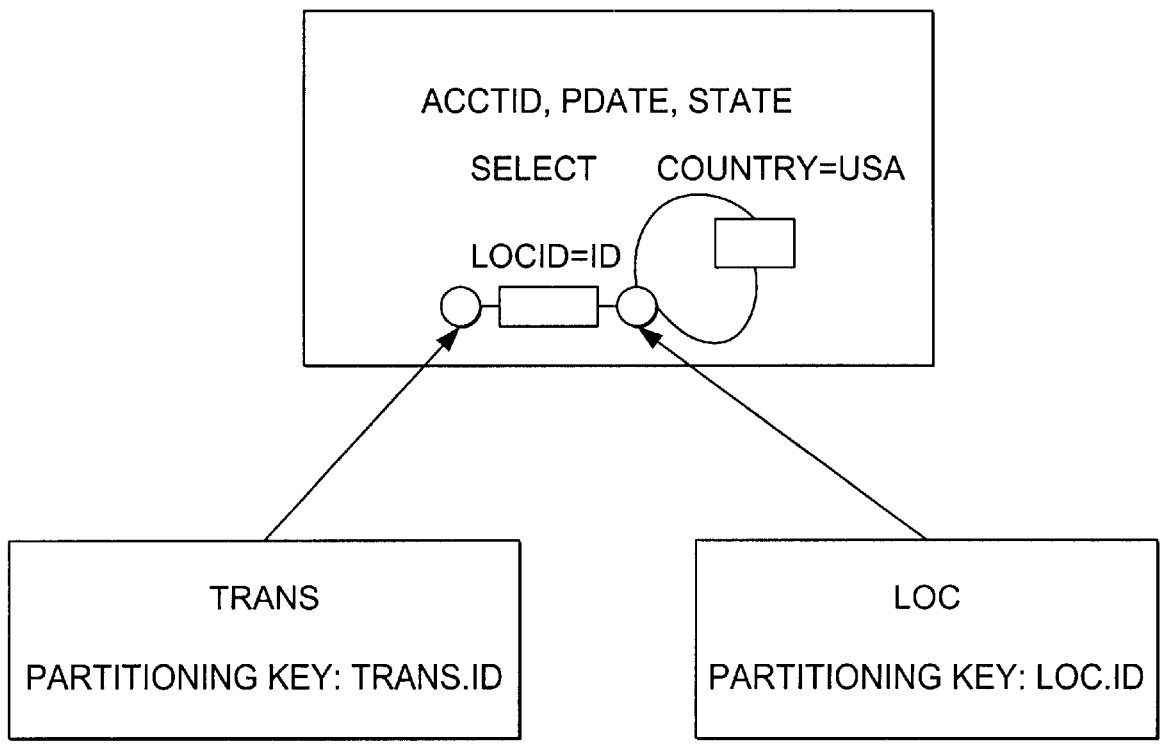
FIGS. 5–10 are block diagrams that illustrate Query Graph Model representations for various SQL statements used in the preferred embodiment of the present invention.

Consider the following query which finds the accounts, transaction dates and state for all transactions made in the USA, where the Query Graph Model representation is shown in FIG. 5:

Q1: SELECT ACCTID, PDATE, STATE
    FROM TRANS T, LOC L
    WHERE T.LOCID=L.ID AND L.COUNTRY='USA';

Recall that table TRANS is partitioned on the values of TRANS.ID and the table LOC is partitioned on the values of LOC.ID, whereas the join predicate is "T.LOCID=L.ID". That is, the join is not local, meaning that in order to perform the join in parallel, some rows from one table would have to move to the processors 102 where the other table resides. Strictly speaking, in order for a join to be local (i.e., no data will be moved among processors 102), the following two conditions must be satisfied:

1. both tables must be co-located in the same set of processors 102, i.e., they are partitioned and distributed on the same set of processors 102 using the same partitioning method; and
2. the equal-join columns for each table must be a superset of the corresponding partitioning key.

Typically, evaluating this query involves re-partitioning one of the tables based on the join column(s). In the above query, the optimizer in the RDBMS software 106 is likely to re-partition table LOC because, generally, a dimension table is smaller and there is a local predicate "COUNTRY=USA" to be applied on the table.

This query evaluation strategy is relatively efficient, but it is not optimal in the sense that a number of rows have to be moved around in order to perform the join in parallel. In order to avoid re-partitioning data in an MPP computer system 100, one approach is to replicate tables across all processors 102 in the system 100, so that joins become local automatically.

Figure 6:
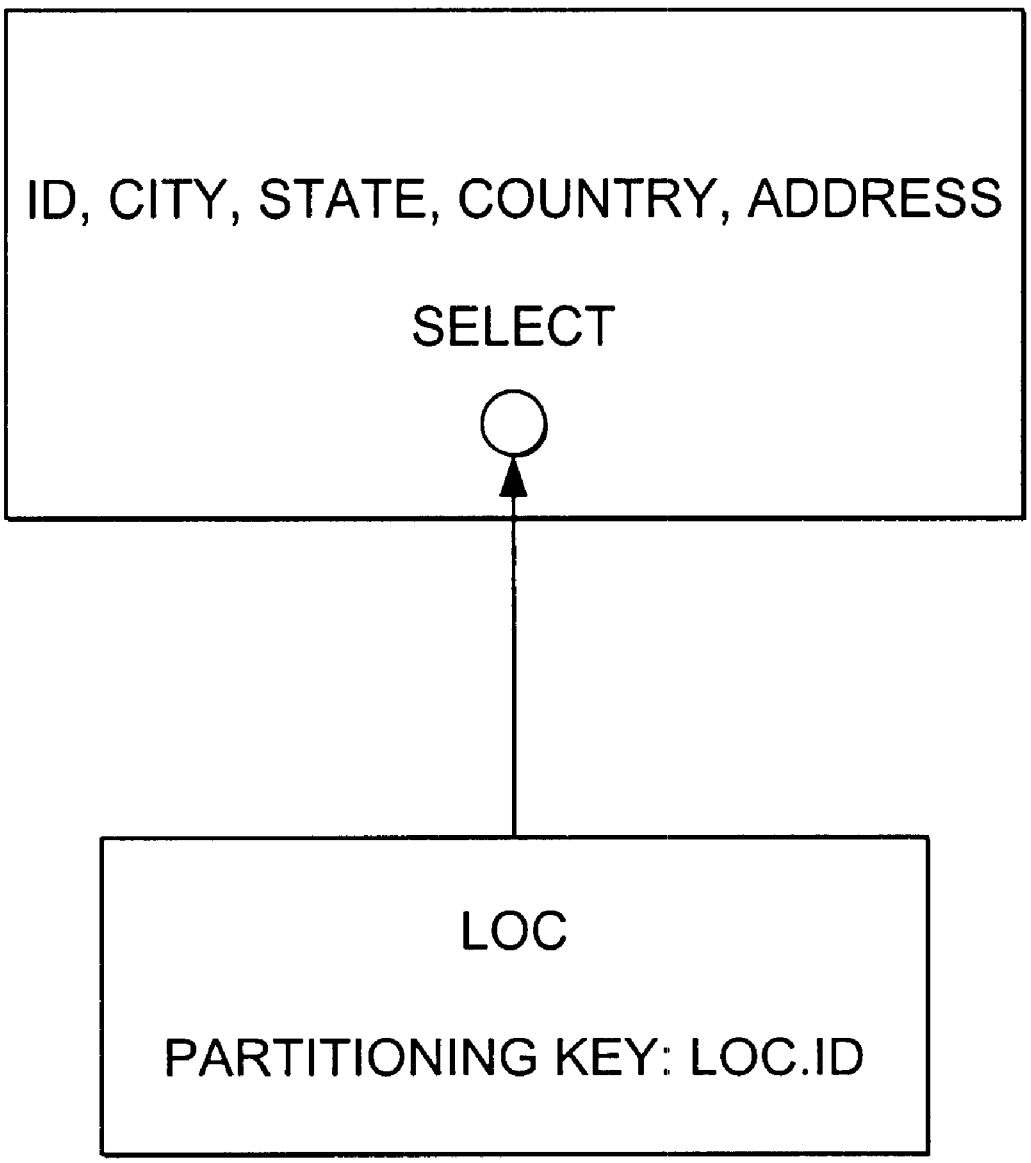

Yet another approach is to replicate a materialized view where the view definition is a simple SELECT statement. For example, consider the simple SELECT statement in a materialized view definition that follows:

CREATE TABLE RLOC1 AS (
SELECT*
FROM LOC)
REPLICATED;

The Query Graph Model representation of the materialized view definition is shown in FIG. 6.

In this approach, the materialized view table RLOC1 is replicated across all the processors 102 in the MPP computer system 100 where table TRANS resides. The optimizer of the RDBMS software 106 can now rewrite the query Q1 using the table RLOC1 in such a way that the join in Q1 becomes local and therefore no rows need to be moved across processors 102.

Figure 7:
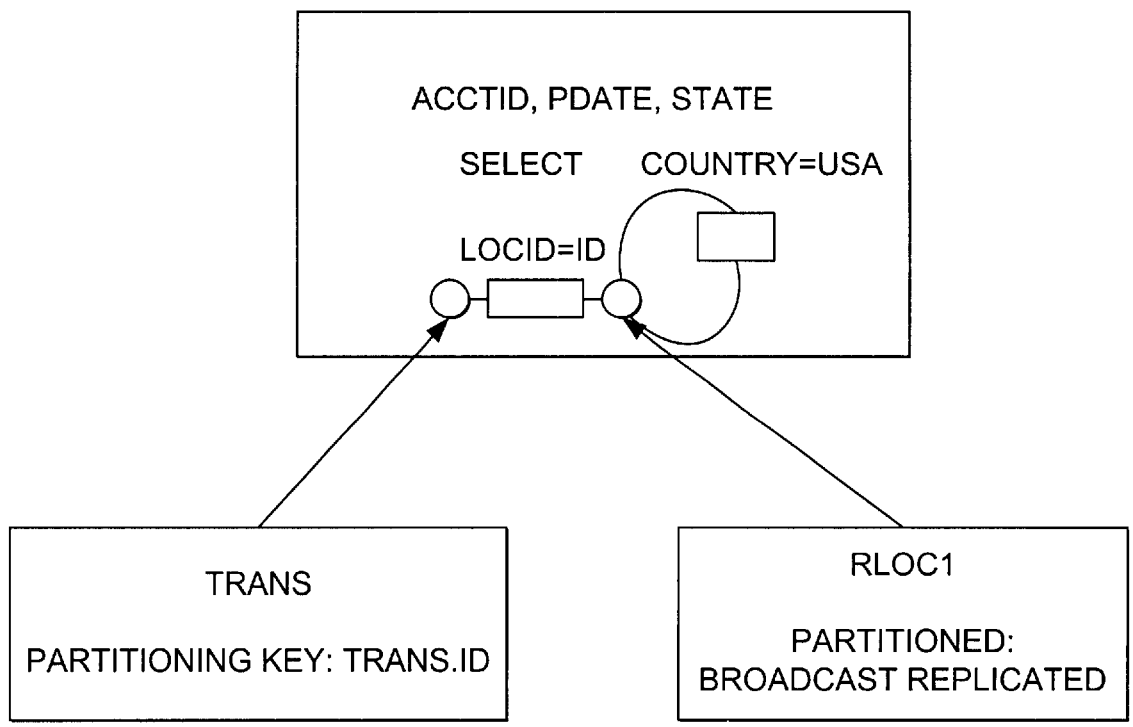

The equivalent rewritten query is shown as follows:

NEW Q1: SELECT ACCTID, PDATE, STATE
    FROM TRANS T, RLOC1 L
    WHERE T.LOCID=L.ID AND L.COUNTRY='USA';

The access to table LOC is thus rerouted to the broadcast replicated materialized view RLOC1 to avoid the costly action of shipping all the values of LOC to all the processors 102 where TRANS resides. Hence, the execution plan of the NEW Q1 is superior to the original Q1. The Query Graph Model representation of this rewritten query is illustrated in FIG. 7. The condition for such re-routing is that the materialized view must be replicated on a superset of processors 102 where the TRANS table resides.

Replicating the entire table (i.e., all rows and all columns) across many processors 102 can speed up execution for many queries. However, when there are changes to the underlying base table(s), the cost of propagating the necessary changes to the replicated materialized views increases. For example, when a new row is inserted into the LOC table, a corresponding row must be inserted into all copies of the RLOC1 table. Such propagation is also required for DELETE and UPDATE operations. Furthermore, there are situations where replicating the entire table has excessive storage requirements, making replication across all processors 102 unattractive.

A better broadcast replicated materialized view would be one that contains only the necessary columns for the query as defined by RLOC2. This is referred to as a vertical subsetting of the base table.

Figure 8:
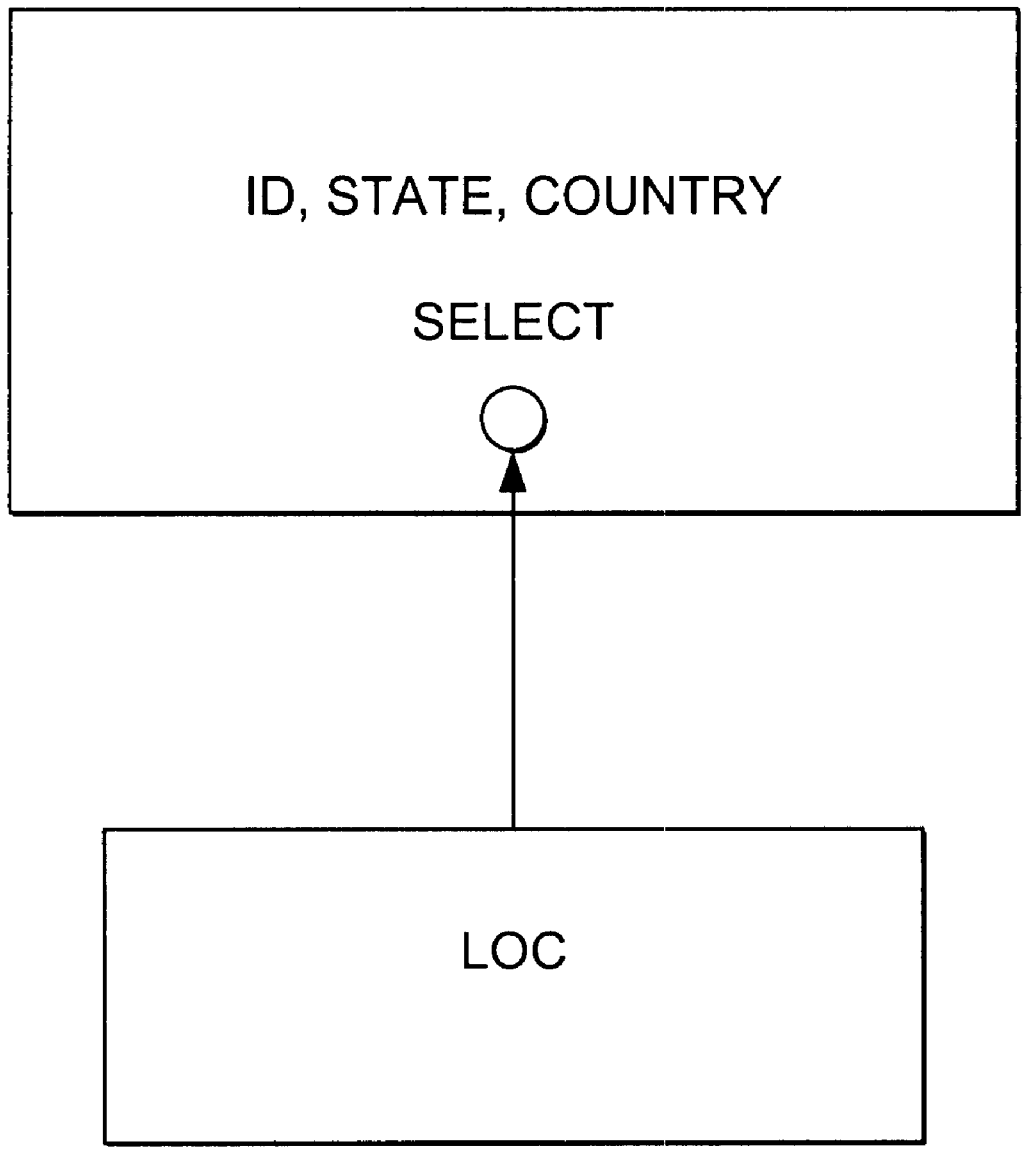

CREATE TABLE RLOC2 AS (
SELECT ID, STATE, COUNTRY
FROM LOC)
REPLICATED;

The Query Graph Model representation of the materialized view definition in RLOC2 is shown in FIG. 8.

This materialized view is more efficient with respect to the query Q1. The reasons include:
    (1) the size of the materialized view table (RLOC2) is smaller because unused columns are not stored (such as the address column which may occupy up to 200 bytes per tuple) and therefore the join is more efficient;

(2) updating unreferenced columns, such as address, in the base table (LOC) would not require updating the materialized view RLOC2.

In short, the above approach selects only the needed columns by referencing only a selected subset of columns from the base table in the materialized view and thus the materialized view not only speeds up the query, it provides a better performance in terms of updates and joins.

Figure 9:
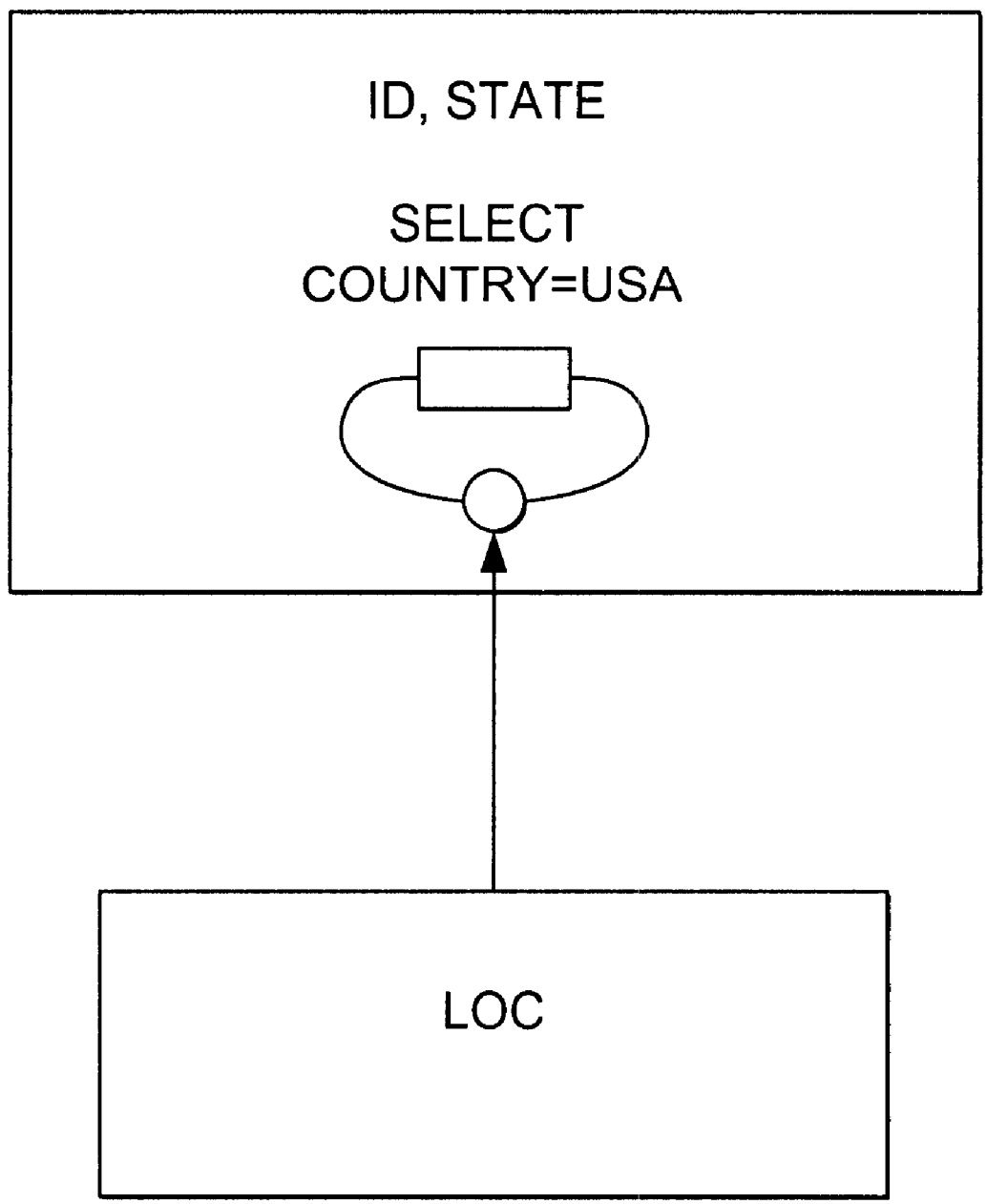
Figure 10:
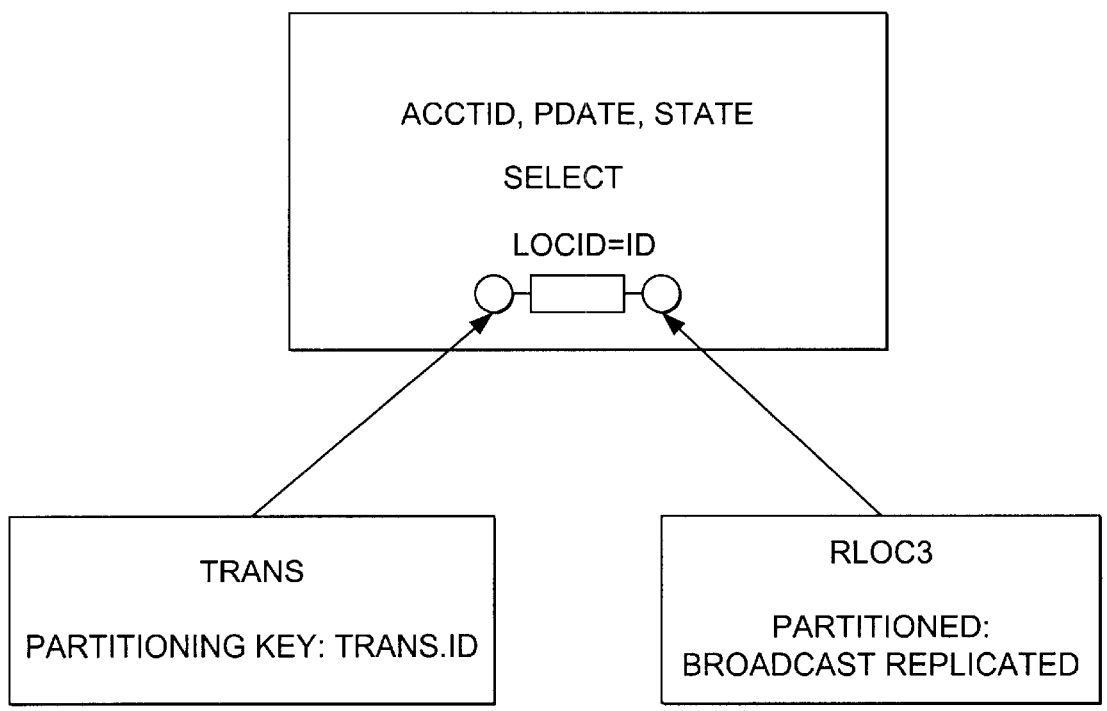

Another efficient replicated materialized view definition for LOC that can be used in rerouting Q1 would include the removal of unnecessary tuples. This approach, called horizontal subsetting, can be specified via a predicate on the base table LOC. In the definition of RLOC3, shown below, techniques of horizontal as well as vertical subsetting are employed, so that minimal information is replicated across nodes and yet it is sufficient to be used for answering queries such as Q1:

CREATE TABLE RLOC3 AS (
SELECT ID, STATE
FROM LOC
WHERE COUNTRY='USA')
REPLICATED;

The Query Graph Model representation of the materialized view definition in RLOC3 is shown in FIG. 9 and the Query Graph Model representation of the rerouted query Q1 is shown in FIG. 10. Note that the predicate "COUNTRY= USA" is not needed in the rerouted query because all rows in RLOC3 must have the same value.

The degree and combinations of horizontal and vertical subsetting can be numerous. One variable may, but does not necessarily, affect the other. For example, if the definition of RLOC3 contains the predicate "COUNTRY=USA", then the column "COUNTRY" need not be in the replicated materialized view, so that the vertical subset can be reduced even further.

To take this approach one step further, a materialized view with extra columns can be created that pre-computes some complex expression. The following replicated materialized view, which stores data concerning "high-paid" salespersons who earn more than $100K, illustrates this idea:

CREATE TABLE RSALESPERSON AS (
SELECT ID, DEPARTMENT, SALARY+
COMMISSION+
BONUS+AWARD AS TOTAL_COMP
FROM SALESPERSON
WHERE SALARY+COMMISSION+BONUS+
AWARD>100000)
REPLICATED;

An index on the TOTAL_COMP column can be created as follows:

CREATE INDEX IDX ON RSALESPERSON(TOTAL_
COMP);

In order to determine the total sales for those salespersons who made more than $500K, the following query Q2 is used:

Q2: SELECT S.ID, SUM(TS.AMOUNT)
FROM SALESPERSON S, TRANS T, TRANSITEM TS
WHERE TS.TRANSID=T.ID AND T.SALESID=S.ID AND
SALARY+COMMISSION+BONUS+AWARD
>500000;

With the broadcast replicated table RSALESPERSON, the above query can be rewritten as follows:

NEW Q2: SELECT RS.ID, SUM(TS.AMOUNT)
FROM RSALESPERSON RS, TRANS T, TRANSITEM TS
WHERE TS.TRANSID=T.ID AND T.SALESID= RS.ID AND
TOTAL_COMP >500000;

With the query rerouted to reference the RSALESPERSON table, its indexes can be exploited by the RDBMS software 106. In this example, the index on the TOTAL_ COMP column can be used to speed up the query execution. Furthermore, the join between the RSALESPERSON and TRANS tables becomes local because the former table is a broadcast replicated table.

Effectively, materialized views provide an alternative mechanism for creating indexes on complex expressions. This index on complex expression feature provides superior performance for many queries. Furthermore, if the index contains all the columns, the table containing the base data can be eliminated, thereby forming an index-only table.

Yet another improvement is to create copies of the materialized views and partition them differently. Thus, the optimizer within the RDBMS software 106 can choose among the differently partitioned materialized view, based on the type of query, to ensure that operations are made local to the processors 102, where possible.

As indicated above, each table can only be partitioned using a pre-defined subset of attributes, wherein the subset of attributes forms the partitioning key. For example, the table ACCTCUST has been arbitrarily partitioned on the ACCTID attribute (the foreign key of table ACCT). This allows local joins with the table ACCT, i.e., the joins can be performed locally without moving data.

However, all joins with the table CUST will be non-local, and thus processing these joins would require moving some data across processors 102. On the other hand, if the table ACCTCUST had been partitioned on the CUSTID column (the foreign key of table CUST), the joins with the table CUST would be local, but the joins with the table ACCT would not.

This asymmetry introduces an acute performance problem for association tables: it is difficult to choose one foreign key over another as the partitioning key. In the example provided above, 50% of the joins may be between table ACCTCUST and table ACCT and 50% of the joins may be between table ACCTCUST and table CUST. Note, also that the data in the association table ACCTCUST does not change frequently and is fairly static.

One approach to handling this problem is to create copies of the association tables, and to partition them differently. Then, the applications can explicitly refer to the particular copy that will make their joins local, that is, it requires modification to the queries in the applications. This leads to heavy application development costs especially when the organization of the database changes such as dropping copies of the association tables. Furthermore, there is no automatic mechanism to update the copies of association tables when the underlying tables are updated.

However, a materialized view can be defined that is an exact copy of the association table, with the exception that its partitioning properties are changed.

Consider the following example:
CREATE TABLE ACCTCUST2 AS (SELECT*FROM ACCTCUST)
PARTITIONING KEY(CUSTID);

When the table ACCTCUST is used in join operations, the optimizer of the RDBMS software 106 can analyze the partition information of the ACCTCUST and ACCTCUST2 tables and decide to use ACCTCUST2 in those situations where it will lead to better performance.

For example, the following query selects those customers that have more than one account:

Q3: SELECT C.NAME, COUNT(*)
   FROM CUST C, ACCTCUST AC
   WHERE C.ID=AC.CUSTID
   GROUP BY C.ID, C.NAME
   HAVING COUNT(*)>1

Without the materialized view ACCTCUST2, this would result in a non-local join between the table CUST and ACCTCUST. However, creating the materialized view ACCTCUST2 allows the optimizer of the RDBMS software 106 to recognize that the join on CUSTID would benefit from a partitioning on CUSTID column, and the optimizer can transform the query into the following:

NEW Q3: SELECT C.NAME, COUNT(*)
   FROM CUST C, ACCTCUST2 AC
   WHERE C.ID=AC.CUSTID
   GROUP BY C.ID, C.NAME
   HAVING COUNT(*)>1

The rewritten optimized query results in a local join, and therefore will typically perform better.

Logic of Creating the Materialized View

Figure 11:
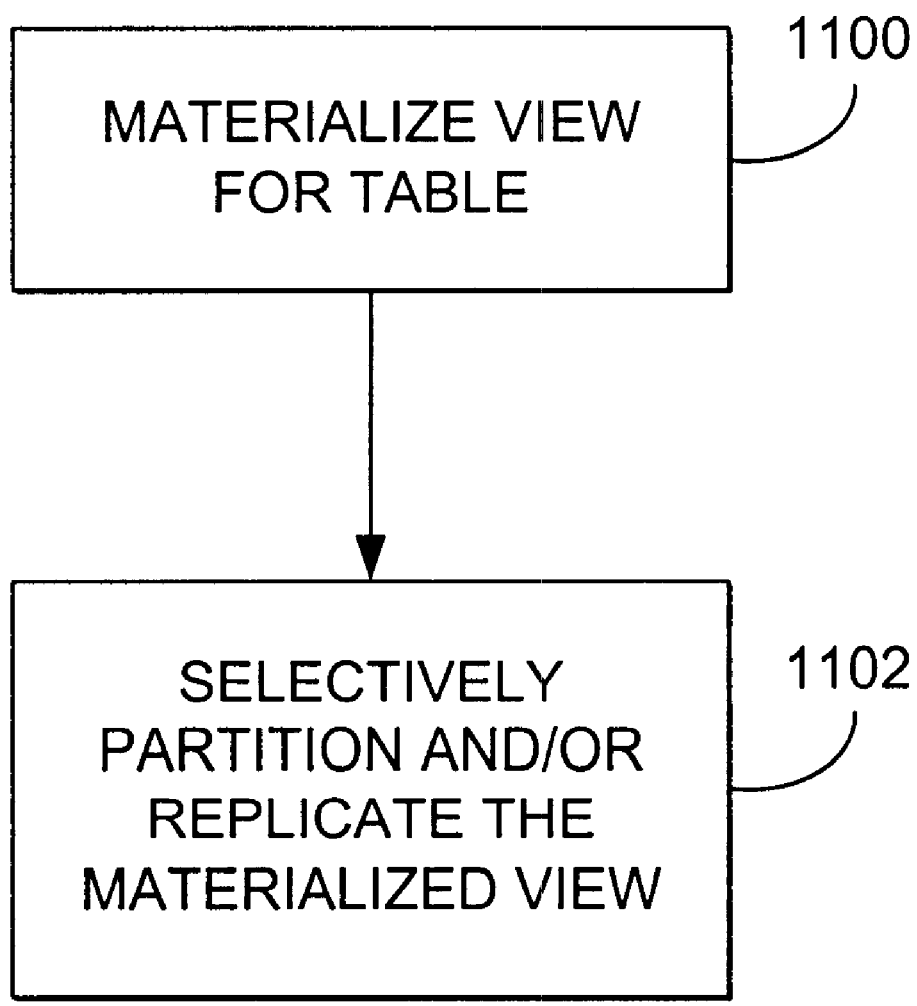
FIG. 11 is a flowchart illustrating the method of creating the replicated materialized view according to the preferred embodiment of the present invention.

FIG. 11 is a flowchart illustrating the method of creating the replicated and/or partitioned materialized view according to the preferred embodiment of the present invention.

Block 1100 represents the computer system 100 materializing a view for a specified table. In some situations, a materialized view results from a vertical and/or horizontal subsetting of the specified table, such that only selected columns and/or tuples from the table are present in the materialized view, so as to make the subsequent replication and updating as efficient as possible. In other situations, the materialized view may contain one or more extra columns that contains the results of one or more pre-computed expressions. Further, indices may be created for the columns of the materialized view containing the pre-computed results.

Block 1102 represents the computer system 100 selectively partitioning the materialized view. In some situations, the materialized view may be partitioned using a different partitioning key than that of the base table. In some situations, the materialized view may be replicated across the processors 102 of the computer system 100.

Logic of the Optimization Technique

Figure 12:
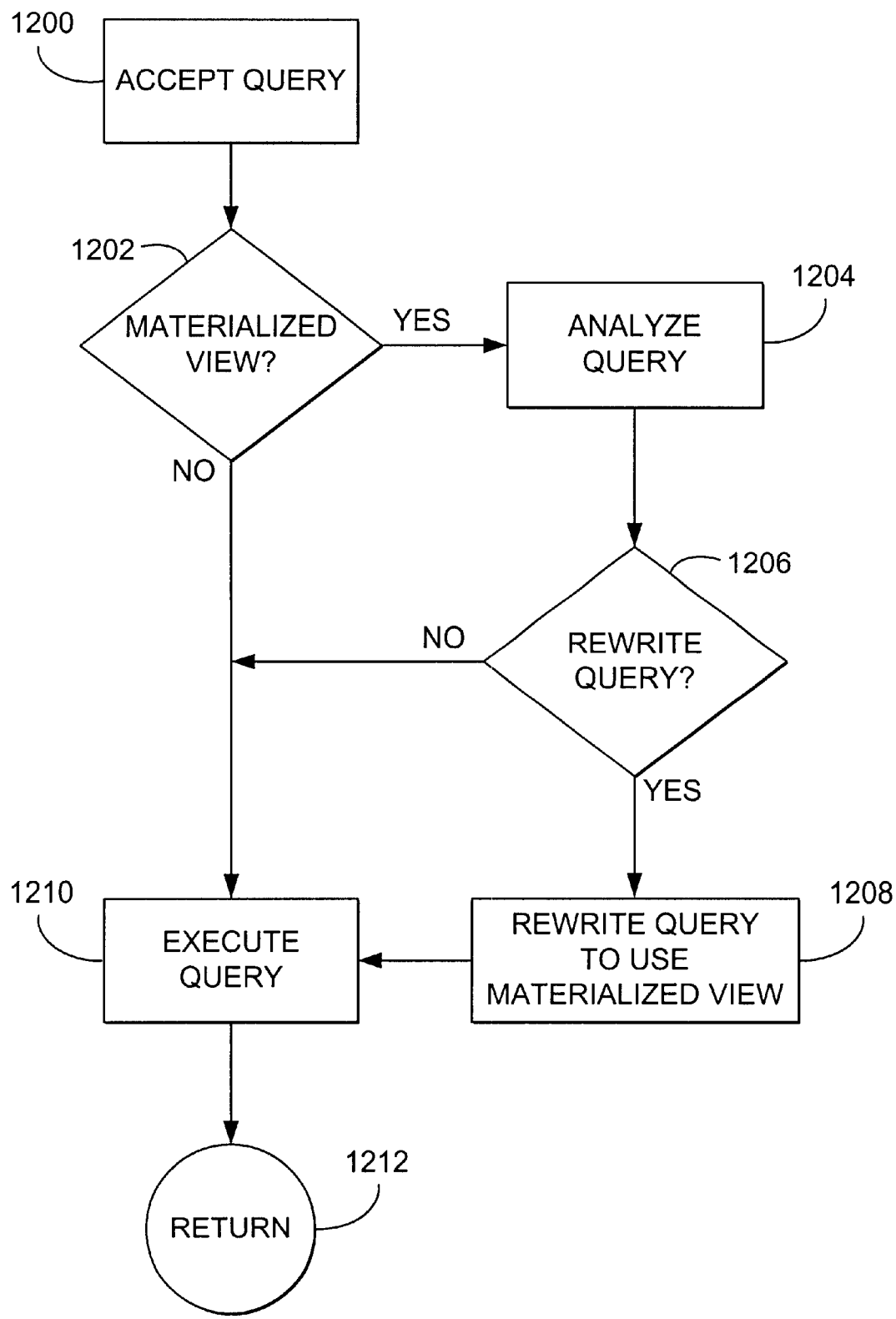
FIG. 12 is a flowchart illustrating the method of optimizing SQL queries according to the preferred embodiment of the present invention.

FIG. 12 is a flowchart illustrating the method of optimizing SQL queries in step 204 of FIG. 2 and step 314 of FIG. 3 according to the preferred embodiment of the present invention.

Block 1200 represents the computer system 100, specifically an optimizer function of the RDBMS software 106, accepting a query.

Block 1202 is a decision block that represents the computer system 100 determining whether there is one or more materialized views referencing a table in the query. If so, control transfers to Block 1204; otherwise, control transfers to Block1210.

Block 1204 represents the computer system 100 analyzing all materialized views created in the system 100 that reference that same table as in the query and yet have different physical properties than those of the table referenced in the query. Specifically, the analysis determines whether some portion or the entire query can be executed in a local fashion using a materialized view. The analysis further determines whether expressions in the query can be derived from one or more columns in the materialized view containing pre-computed results and whether indices on these columns in the materialized view can be exploited for query performance.

Block 1206 is a decision block that represents the computer system 100 determining whether the query should be rewritten to take advantage of one or more of the materialized views. If so, control transfers to Block 1208; otherwise, control transfers to Block 1210.

Block 1208 represents the computer system 100 rewriting the query to use the materialized view that has different properties than the table referenced in the query.

Block 1210 represents the computer system 100 executing the query.

After these query transformation steps are performed, block 1212 returns control to block 204 in FIG. 2 or block 314 in FIG. 3 for subsequent processing steps, including the execution of the SQL query against the relational database and the output of the result set.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for optimizing database queries using a materialized view for a table referenced in the query, wherein the materialized view has different properties than the table referenced in the query and these properties include partitioning strategies and replication strategies. The query is rewritten to use the materialized view rather than the referenced table.

The materialized view may be a vertical and/or horizontal subset of the table, so that only selected columns and/or tuples from the table are present therein. Moreover, columns may be added to the materialized view to contain pre-computed results of expressions, and indices may be created on the columns. In addition, the materialized view may be replicated across multiple processors of the computer system. Finally, the materialized view may be partitioned across multiple processors of the computer system and the partitioning key may be different from that of the table referenced in the query.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer system, the query being performed by the computer system to retrieve data from a database stored on the computer system, the method comprising the steps of:

(a) accepting the query into the computer system;

(b) determining whether there exists one or more materialized views for one or more tables referenced in the query, wherein the materialized view has different partitioning or replication properties than the tables referenced in the query;

(c) analyzing whether at least a portion of the query can be evaluated using one or more of the materialized views in a local fashion, so that no data movement is required for the evaluation;

(d) rewriting the query to use one or more materialized views rather than an original table or tables referenced in the query; and (e) executing the rewritten query using one or more materialized views.

2. The method of claim 1, wherein the computer system is comprised of a plurality of processors.

3. The method of claim 2, wherein the materialized view is replicated across the processors of the computer system.

4. The method of claim 2, wherein the materialized view is partitioned across the processors of the computer system.

5. The method of claim 1, wherein the materialized view comprises only selected columns of the table.

6. The method of claim 1, wherein the materialized view comprises only selected tuples of the table.

7. The method of claim 1, wherein the materialized view includes one or more columns containing pre-computed results from one or more expressions.

8. The method of claim 1, wherein the materialized view includes one or more indices on one or more columns of the materialized view.

9. The method of claim 1, wherein the analyzing step comprises the step of identifying a join of a first table and a second table in the query, wherein a materialized view is substitutable for the second table, the materialized view is local with the first table, and the join is performed locally.

10. The method of claim 1, wherein the analyzing step comprises the step of identifying a left join of a first table and a second table in the query, wherein a materialized view is substitutable for the second table, the materialized view is local with the first table, and the left join is performed locally.

11. The method of claim 1, wherein the analyzing step comprises the step of identifying a right join of a first table and a second table in the query, wherein a materialized view is substitutable for the first table, the materialized view is local with the second table, and the right join is performed locally.

12. The method of claim 1, wherein the analyzing step comprises the step of identifying a full join of a first table and a second table in the query, wherein a first materialized view is substitutable for the first table and a second materialized view is substitutable for the second table, the first and second materialized views are co-located in at least one processor, and the full join is performed locally.

13. A method of optimizing a query in a computer system having a plurality of processors, the query being performed by the computer system to retrieve data from a database stored across the processors of the computer system, the method comprising the steps of:

(a) materializing a view for a table of the database, wherein the materialized view has different properties than the table;

(b) replicating the materialized view across the processors of the computer system;

(c) analyzing a query into the computer system to determine whether the materialized view can be substituted for a table referenced in the query, so that at least a portion of the query can be evaluated in a local fashion;

(d) rewriting the query to use the replicated materialized view rather than the table referenced in the query; and (e) executing the query using the replicated materialized view.

14. The method of claim 13, wherein another table referenced in the query is comprised of a plurality of partitions and the replicating step comprises the step of replicating the materialized view so that it is local with each of the partitions.

15. The method of claim 13, wherein the replicating step comprises the step of broadcast replicating the materialized views across the processors of the computer system.

16. The method of claim 13, wherein the materialized view comprises only selected columns of the table and the replicating step comprises the step of replicating only the selected columns across the processors of the computer system.

17. The method of claim 13, wherein the materialized view comprises only selected rows of the table and the replicating step comprising the step of replicating only the selected rows across the processors of the computer system.

18. The method of claim 13, wherein the materialized view comprises one or more columns containing pre-computed results of one or more complex expressions in the query.

19. The method of claim 18, further comprising the step of creating an index for the column of the materialized view containing the pre-computed results.

20. The method of claim 13, further comprising the step of partitioning the materialized view across the processors of the computer system.

21. The method of claim 13, wherein the analyzing step comprises the step of identifying a join of a first table and a second table in the query, wherein the materialized view is substitutable for the second table, the materialized view is local with the first table, and the join is performed locally.

22. The method of claim 13, wherein the analyzing step comprises the step of identifying a left join of a first table and a second table in the query, wherein the materialized view is substitutable for the second table, the materialized view is local with the first table, and the left join is performed locally.

23. The method of claim 13, wherein the analyzing step comprises the step of identifying a right join of a first table and a second table in the query, wherein the materialized view is substitutable for the first table, the materialized view is local with the second table, and the right join is performed locally.

24. The method of claim 13, wherein the analyzing step comprises the step of identifying a full join of a first table and a second table in the query, wherein a first materialized view is substitutable for the first table and a second materialized view is substitutable for the second table, the first and second materialized views are co-located in at least one processor, and the full join is performed locally.

25. An apparatus for optimizing a query, comprising:

(a) a computer system having a data storage device coupled thereto for storing a database, the query being performed by the computer to retrieve data from the database; and (b) means, performed by the computer system, for accepting the query into the computer system; for determining whether there exists one or more materialized views for one or more tables referenced in the query, wherein the materialized view has different partitioning or replication properties than the tables referenced in the query; for analyzing whether at least a portion of the query can be evaluated using one or more of the materialized views in a local fashion, so that no data movement is required for the evaluation, for rewriting the query to use one or more materialized views rather than an original table or tables referenced in the query; and for executing the rewritten query using one or more materialized views.

26. The apparatus of claim 25, wherein the computer system is comprised of a plurality of processors.

27. The apparatus of claim 26, wherein the materialized view is replicated across the processors of the computer system.

28. The apparatus of claim 26, wherein the materialized view is partitioned across the processors of the computer system.

29. The apparatus of claim 25, wherein the materialized view comprises only selected columns of the table.

30. The apparatus of claim 25, wherein the materialized view comprises only selected tuples of the table.

31. The apparatus of claim 25, wherein the materialized view includes one or more columns containing pre-computed results from one or more expressions.

32. The apparatus of claim 25, wherein the materialized view includes one or more indices on one or more columns of the materialized view.

33. The apparatus of claim 25, wherein the means for analyzing comprises means for identifying a join of a first table and a second table in the query, wherein a materialized view is substitutable for the second table, the materialized view is local with the first table, and the join is performed locally.

34. The apparatus of claim 25, wherein the means for analyzing comprises means for identifying a left join of a first table and a second table in the query, wherein a materialized view is substitutable for the second table, the materialized view is local with the first table, and the left join is performed locally.

35. The apparatus of claim 25, wherein the means for analyzing comprises means for identifying a right join of a first table and a second table in the query, wherein a materialized view is substitutable for the first table, the materialized view is local with the second table, and the right join is performed locally.

36. The apparatus of claim 25, wherein the means for analyzing comprises means for identifying a full join of a first table and a second table in the query, wherein a first materialized view is substitutable for the first table and a second materialized view is substitutable for the second table, the first and second materialized views are co-located in at least one processor, and the full join is performed locally.

37. An apparatus for optimizing a query, comprising:
 (a) a computer having a plurality of processors, the query being performed by the computer to retrieve data from a database stored across the processors of the computer system; and
 (b) means, performed by the computer, for materializing a view for a table of the database, wherein the materialized view has different properties than the table; for replicating the materialized view across the processors of the computer system; for analyzing a query into the computer system to determine whether the materialized view can be substituted for a table referenced in the query, so that at least a portion of the query can be evaluated in a local fashion; for rewriting the query to use the replicated materialized view rather than the table referenced in the query; and for executing the query using the replicated materialized view.

38. The apparatus of claim 37, wherein another table referenced in the query is comprised of a plurality of partitions and the means for replicating comprises means for replicating the materialized view so that it is local with each of the partitions.

39. The apparatus of claim 37, wherein the means for replicating comprises means for broadcast replicating the materialized views across the processors of the computer system.

40. The apparatus of claim 37, wherein the materialized view comprises only selected columns of the table and the means for replicating comprises means for replicating only the selected columns across the processors of the computer system.

41. The apparatus of claim 37, wherein the materialized view comprises only selected rows of the table and the means for replicating comprises means for replicating only the selected rows across the processors of the computer system.

42. The apparatus of claim 37, wherein the materialized view comprises one or more columns containing pre-computed results of one or more complex expressions in the query.

43. The apparatus of claim 42, further comprising means for creating an index for the column of the materialized view containing the pre-computed results.

44. The apparatus of claim 37, further comprising means for partitioning the materialized view across the processors of the computer system.

45. The apparatus of claim 37, wherein the means for analyzing comprises means for identifying a join of a first table and a second table in the query, wherein the materialized view is substitutable for the second table, the materialized view is local with the first table, and the join is performed locally.

46. The apparatus of claim 37, wherein the means for analyzing comprises means for identifying a left join of a first table and a second table in the query, wherein the materialized view is substitutable for the second table, the materialized view is local with the first table, and the left join is performed locally.

47. The apparatus of claim 37 wherein the means for analyzing comprises means for identifying a right join of a first table and a second table in the query, wherein the materialized view is substitutable for the first table, the materialized view is local with the second table, and the right join is performed locally.

48. The apparatus of claim 37, wherein the means for analyzing comprises means for identifying a full join of a first table and a second table in the query, wherein a first materialized view is substitutable for the first table and a second materialized view is substitutable for the second table, the first and second materialized views are co-located in at least one processor, and the full join is performed locally.

49. An article of manufacture embodying logic for performing method steps for optimizing a query, the query being performed by a computer system to retrieve data from a database stored in a data storage device coupled to the computer system, the method comprising the steps of:
 (a) accepting the query into the computer system;
 (b) determining whether there exists one or more materialized views for one or more tables referenced in the query, wherein the materialized view has different partitioning or replication properties than the tables referenced in the query;

(c) analyzing whether at least a portion of the query can be evaluated using one or more of the materialized views in a local fashion, so that no data movement is required for the evaluation;

(d) rewriting the query to use one or more materialized views rather than an original table or tables referenced in the query; and (e) executing the rewritten query using one or more materialized views.

50. The method of claim 49, wherein the computer system is comprised of a plurality of processors.

51. The method of claim 50, wherein the materialized view is replicated across the processors of the computer system.

52. The method of claim 50, wherein the materialized view is partitioned across the processors of the computer system.

53. The method of claim 49, wherein the materialized view comprises only selected columns of the table.

54. The method of claim 49, wherein the materialized view comprises only selected tuples of the table.

55. The method of claim 49, wherein the materialized view includes one or more columns containing pre-computed results from one or more expressions.

56. The method of claim 49, wherein the materialized view includes one or more indices on one or more columns of the materialized view.

57. The method of claim 49, wherein the analyzing step comprises the step of identifying a join of a first table and a second table in the query, wherein a materialized view is substitutable for the second table, the materialized view is local with the first table, and the join -is performed locally.

58. The method of claim 49, wherein the analyzing step comprises the step of identifying a left join of a first table and a second table in the query, wherein a materialized view is substitutable for the second table, the materialized view is local with the first table, and the left join is performed locally.

59. The method of claim 49, wherein the analyzing step comprises the step of identifying a right join of a first table and a second table in the query, wherein a materialized view is substitutable for the first table, the materialized view is local with the second table, and the right join is performed locally.

60. The method of claim 49, wherein the analyzing step comprises the step of identifying a full join of a first table and a second table in the query, wherein a first materialized view is substitutable for the first table and a second materialized view is substitutable for the second table, the first and second materialized views are co-located in at least one processor, and the full join is performed locally.

61. An article of manufacture embodying logic for performing method steps for optimizing a query, the query being performed by a computer system having a plurality of processors to retrieve data from a database stored across the processors of the computer system, the method comprising the steps of:

(a) materializing a view for a table of the database, wherein the materialized view has different properties than the table;

(b) replicating the materialized view across the processors of the computer system;

(c) analyzing a query into the computer system to determine whether the materialized view can be substituted for a table referenced in the query, so that at least a portion of the query can be evaluated in a local fashion;

(d) rewriting the query to use the replicated materialized view rather than the table referenced in the query; and (e) executing the query using the replicated materialized view.

62. The method of claim 61, wherein another table referenced in the query is comprised of a plurality of partitions and the replicating step comprises the step of replicating the materialized view so that it is local with each of the partitions.

63. The method of claim 61, wherein the replicating step comprises the step of broadcast replicating the materialized views across the processors of the computer system.

64. The method of claim 61, wherein the materialized view comprises only selected columns of the table and the replicating step comprises the step of replicating only the selected columns across the processors of the computer system.

65. The method of claim 61, wherein the materialized view comprises only selected rows of the table and the replicating step comprising the step of replicating only the selected rows across the processors of the computer system.

66. The method of claim 61, wherein the materialized view comprises one or more columns containing pre-computed results of one or more complex expressions in the query.

67. The method of claim 66, further comprising the step of creating an index for the column of the materialized view containing the pre-computed results.

68. The method of claim 61, further comprising the step of partitioning the materialized view across the processors of the computer system.

69. The method of claim 61, wherein the analyzing step comprises the step of identifying a join of a first table and a second table in the query, wherein the materialized view is substitutable for the second table, the materialized view is local with the first table, and the join is performed locally.

70. The method of claim 61, wherein the analyzing step comprises the step of identifying a left join of a first table and a second table in the query, wherein the materialized view is substitutable for the second table, the materialized view is local with the first table, and the left join is performed locally.

71. The method of claim 61, wherein the analyzing step comprises the step of identifying a right join of a first table and a second table in the query, wherein the materialized view is substitutable for the first table, the materialized view is local with the second table, and the right join is performed locally.

72. The method of claim 61, wherein the analyzing step comprises the step of identifying a full join of a first table and a second table in the query, wherein a first materialized view is substitutable for the first table and a second materialized view is substitutable for the second table, the first and second materialized views are co-located in at least one processor, and the full join is performed locally.

* * * * *

UNITED STATES PATENT AND TRADEMARK OFFICE
CERTIFICATE OF CORRECTION

PATENT NO.   : 6,339,769 B1                                    Page 1 of 1
DATED        : January 15, 2002
INVENTOR(S)  : Roberta Jo Cochrane et al.

It is certified that error appears in the above-identified patent and that said Letters Patent is hereby corrected as shown below:

Column 13,
Line 66, "a" should read -- said --.

Column 15,
Line 63, "a" should read -- said --.

Column 18,
Line 3, "a" should read -- said --.

Signed and Sealed this

Thirteenth Day of May, 2003

JAMES E. ROGAN
*Director of the United States Patent and Trademark Office*